June 18, 1957  W. A. WOLF  2,796,483
AUTOMOBILE HEADLAMP DIMMER SWITCH
Filed June 29, 1955
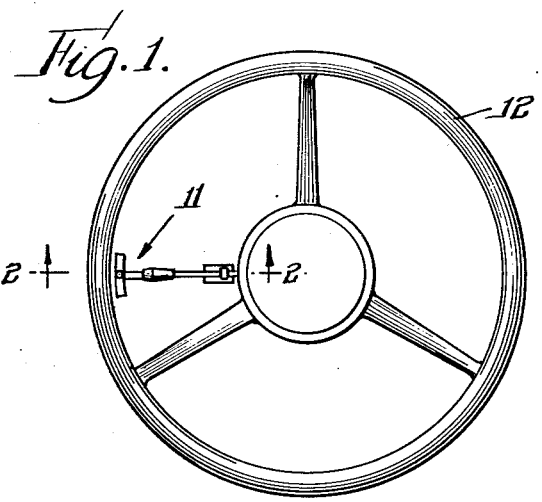
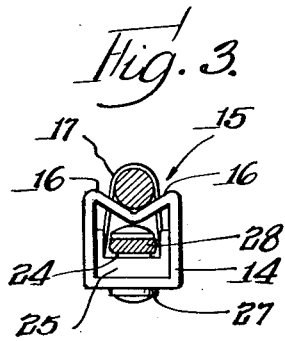
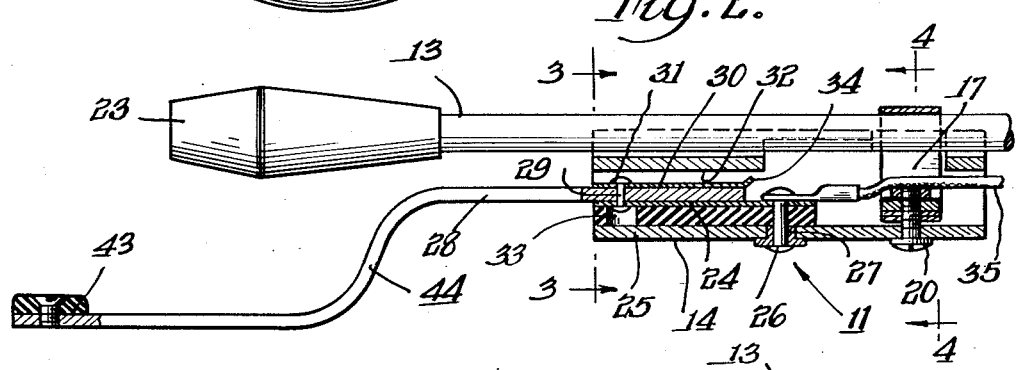
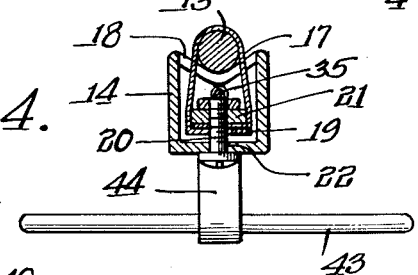
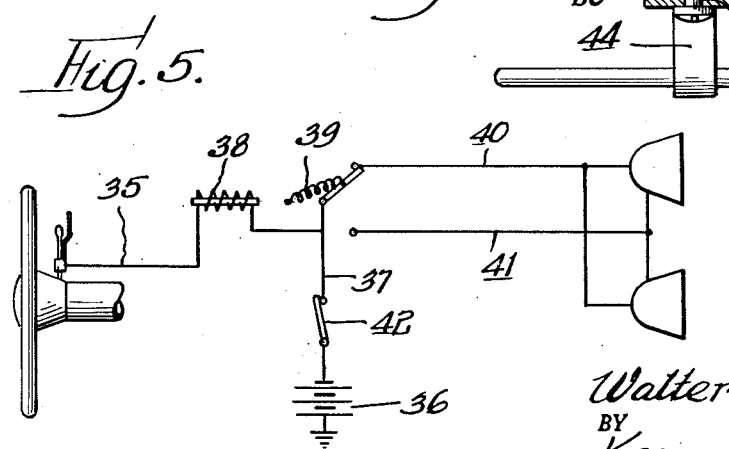
INVENTOR.
Walter A. Wolf
BY Kegan and Kegan
Attys.

United States Patent Office 2,796,483
Patented June 18, 1957

2,796,483

AUTOMOBILE HEADLAMP DIMMER SWITCH

Walter A. Wolf, Logansport, Ind., assignor to Switches, Inc., Chicago, Ill., a corporation of Indiana Application June 29, 1955, Serial No. 518,891

5 Claims. (Cl. 200—61.54)

This invention relates to an automobile headlamp switching control which is attachable to the automobile steering column, and more particularly to the turn signal indicator switch arm, for switching the headlamps from bright to dim, and vice versa.

The general object of the invention is the provision of an improved hand operated switch mechanism which is conveniently located with reference to the steering wheel so that it may be readily operated to regulate the automobile headlamps.

Among the other objects of the invention are the following: to provide a switching control which is easily applied to any automobile construction and which is preferably carried by the switching arm of the turn signal indicator; to provide a switching control which can be operated by a simple rocking movement; to provide a switching control which, while located adjacent the steering wheel, does not interfere with accessibility to the wheel; and to provide a switching control which is compact and simple in construction, economical to manufacture, and durable in use.

Also, further objects of this invention are to provide an automobile headlamp switching control which is mountable in a convenient and visible location; and to provide a control which allows the feet to be used exclusively for essential accelerating, braking and clutching operations.

In accomplishing the objects set forth above, as well as other objects, the invention provides a novel switch casing adapted to be mounted on the automobile turn signal switch arm. Within the casing a switching lever is yieldably maintained in neutral position by a spring acting thereon. The spring, switching lever and casing are so arranged that the switching lever may be rocked in either one of opposite directions and still contact the same inner casing well to complete the necessary circuitry to switch the automobile headlamps.

The invention may be applied as part of the original equipment of new cars or as a replacement part for floor switches which, because they are foot operated, are subject to much abuse and thus require expensive engineering, materials and fabrication of parts to assure long life. In contrast, the present invention requires only the slightest touch of the hand to switch the headlamps, needs a negligible amount of repairs, and may be inexpensively manufactured.

For a thorough understanding of the invention and its features of construction, reference is made to the accompanying drawings, in which:

Figure 1 is a view from the driver's position showing the headlamp switching control mounted on the turn signal switch arm;

Figure 2 is an enlarged view taken on lines 2—2 in Figure 1;

Figure 3 is a cross-sectional view taken on lines 3—3 in Figure 2;

Figure 4 is a cross-sectional view taken on lines 4—4 in Figure 2; and

Figure 5 is a schematic diagram showing one preferred form of circuits with certain mechanisms constructed and arranged in accordance with the invention.

Referring to Figure 1, the headlamp switching control, indicated generally at 11, is located adjacent to the automobile steering wheel 12 so that it is conveniently accessible without need of moving the hands from the steering wheel. Specifically, the invention is mounted on the turn signal indicator switch arm 13. Switch arm 13 itself extends from, and is movable in a plane generally perpendicular to the longitudinal axis of, the automobile steering column, as is well known in the art. To operate the switching control while gripping the steering wheel, all that need be done is to open one of the fingers from its grip on the wheel and rock the control handle with the open finger. In the meanwhile, the remainder of the hand continues to grip the wheel for steering.

As seen in Figure 2, the headlamp switching control 11 is mounted below, and its actuating lever extends beyond, arm 13. It is to be understood, however, that headlamp switching control 11 may be mounted on arm 13 in any position that suits the driver's convenience.

Referring now to Figures 2–4, the switching control comprises a casing 14, the underside of which is formed into the shape of an inverted trough 15. When casing 14 is mounted on arm 13, trough sides 16—16 are adapted to straddle arm 13, enabling the presentation of a firmly held and compact control arrangement.

To lock casing 14 to arm 13, a flexible clamping strap 17 is provided by passing it through an aperture 18 in casing underside 15. Each overlapping end of strap 17 has a hole 19 for the passage of a bolt 20 therethrough to a nut 21 carried by one strap end. The ends of strap 17 may be flexed apart to permit the insertion of arm 13 within the strap structure, after which the strap ends are urged together and passed through casing aperture 18. Thereafter, bolt 20 is passed through a hole 22 in the casing top and threaded into nut 21, pulling strap 17 tightly about arm 13 until casing 14 is held firmly in place.

This form of flexible clamping structure, having ends which may be flexed apart, is preferable, since many switching arms 13 have non-removable handles 23 which otherwise would prevent insertion of the clamping strap over arm 13. The herein described clamping structure, on the other hand, being adaptable to universal use on all switching arms 13, eliminates the need of various special clamps for attaching the invention to all makes and models of cars.

Within casing 14 a leaf spring 24 is insulatingly held in a channel shaped insulation block 25 by a rivet 26 which fastens both block 25 and spring 24 to casing 14. An insulator 27 electrically isolates rivet 26 from casing 14. Switch lever 28 is fastened to spring 24, adjacent the outer end thereof, by a rivet 29 which further holds an electrical contactor structure 30 to lever 28. As lever 28 is moved upwardly, as viewed in Figure 2, spring 24 flexes sufficiently to enable contactor end 31 to strike the inner wall surface 32 of the apex portion of inverted trough 15. Release of pressure on lever 28 allows spring 24 to return contactor 30 to its neutral position. A recess 33 is provided in insulating block 25 so that the head of rivet 29 does not interfere with contactor 30 achieving this position. Similarly, a downward pressure on lever 28, as viewed in Figure 2, flexes spring 24 and enables contactor end 34 to engage inner surface 32. Thereafter, release of said pressure permits spring 24 to return contactor 30 to its neutral position.

An electrical lead 35 is connected to rivet 26, which is of the electrical potential as spring 24, lever 28 and contactor 30. Thus, as either end of contactor 30 engages inner surface 32, it is able to complete an electrical circuit from lead 35 through the switching control to ground.

Referring now to Figures 2 and 5 closing the gap between contactor 30 and inner wall 32 completes an electrical circuit from the automobile battery 36 through lead 37 to energize switching relay coil 38, which, in turn, actuates latch 39. Actuation of latch 39 completes a circuit either to conductor 40 or to conductor 41 to operate either the bright or dim headlamps. Switch 42 prevents operation of the headlamps when they are not needed.

Rocking of lever 28 is achieved by applying pressure on handle 43. Handle 43 preferably extends beyond arm 13 so that it is easily reached without hitting turn signal arm 13, and offset portion 44 assures that the switch handles of the two switching controls will not interfere with each other. No matter in which direction pressure is applied to handle 43 to rock lever 28, contactor 30 is adapted to strike the grounded inner wall surface 32 of trough 15. Immediately thereafter coil 38 is energized to actuate latch 39 and complete the electrical circuitry to operate the bright or dim headlamps, as desired.

It is obvious that it is particularly advantageous to locate the headlamp switching control on the turn signal indicator switch arm since the vast majority of drivers are already accustomed to reach to this location for signalling purposes. Moreover, the removal of the headlamp control from the conventional floor switch to the steering column has particular utility in new cars having automatic transmissions. The brake pedals in these cars usually are placed near the center of the driver's position so that they may be operated by either foot. With the possibility of the left foot thus being occupied in other driving operations, it becomes desirable to move the headlamp control to a position whereat it may be hand operated. The present invention provides a simple and inexpensive switching control for meeting these needs.

Also, there are times when both feet are needed to operate the accelerator, brake and clutch in combination with one another. At such times it is not possible to operate a floor type switching control; although the need for such operation may be imperative. With the herein described invention, however, it is possible to use both feet for essential driving operations, maintain the hands on the steering wheel for essential steering operations, and still be able to switch the headlamps merely by extending a finger from the wheel until it engages and rocks handle 43.

It is to be understood that the invention is not restricted to the specific illustrated and described embodiment, and that various changes may be made without departing from the spirit of the invention. Other forms suggest themselves, as for example, the clamping straps may be enlarged so that the switching control may be mounted directly on the steering column in automobiles having no turn signal indicator switch arm.

I claim:

1. An automobile headlamp switching control adapted to be mounted on the automobile turn signal indicator switching arm, comprising a casing; a V-shaped side on said casing for straddling said switching arm; a flexible clamping strap passing through an aperture in said side and adapted to surround the switching arm and hold the casing thereto; a nut carried by said strap within said casing; a bolt positioned in said casing to threadably engage said nut, whereby as said bolt is threaded into said nut, said clamping strap is drawn upon to snugly engage the switching arm in said V-shaped side; an insulating block mounted within said casing; a leaf spring mounted on said block; a switching lever carried by said spring and rockable thereon in opposed directions; and a pair of spaced contacts on said switching lever normally held in a neutral position by said spring, one of said contacts being engageable with the apex of said V-shaped side when said switching lever is rocked in one of said opposed directions, and the other of said contacts being engageable with said apex when the switching arm is rocked in the other of said opposed direction, whereby engagement by either of said contacts with said apex closes an electrical circuit to switch the headlamps from bright to dim, and vice versa.

2. A switching control for mounting to the arm of an automobile turn signal indicator, comprising: a switch casing; a trough shaped side on said casing adapted to straddle said arm; a flexible clamping strap extending from said casing, and having means to effect drawing thereof tightly about said arm; a first contact area on the casing inner wall; a switch lever extending apart from said arm, whereby either said arm or said lever may be selectively operated; a spring mounted within said casing, connected with said lever, and adapted releasably to hold the same in a neutral position; and a second contact area carried by said spring, normally spaced from said first contact area, complemental thereto and engageable therewith to close an electric circuit as pressure is applied to said lever.

3. A switching control for mounting to the arm of an automobile turn signal indicator, comprising: a switch casing; a trough-shaped wall on said casing adapted to straddle said arm; a clamping strap extending from said casing, and having means to effect drawing thereof tightly to said arm; a stationary contact area on the casing inner wall; a switch lever extending from said casing and apart from said arm, whereby said arm and said lever each may be selectively operated independently of the other; a spring mounted within said casing, connected with said lever, and arranged to releasably hold the same in a neutral position; and a first movable contact area carried by said lever within said casing, normally spaced from said stationary contact area, complemental thereto and engageable therewith to close an electric circuit as pressure is applied on said lever.

4. A switching control as described in claim 3, and additionally including another movable contact area carried by said lever within said casing, displaced therealong from said first movable contact area but engageable with said stationary contact area, whereby said movable contact areas are alternately engageable with said stationary contact area upon said lever being rocked in opposed senses.

5. The combination for use on an automobile steering column, of a first arm pivotally mounted thereto for movement in a plane substantially perpendicular to the longitudinal axis of said column to control operation of the automobile turn signal indicators, and a head lamp switching control including a switch casing having a trough-shaped wall adapted to straddle said first arm, a flexible clamping strap extending from said casing and having means to effect drawing thereof tightly about said first arm, a first stationary contact area within said casing, a second arm extending from said casing and apart from said first arm whereby said arms may be selectively operated independently of each other, a spring mounted within said casing, connected with said second arm, and adapted to releasably hold the same in a neutral position, and a second movable contact area controlled by said second arm, normally spaced from said first contact area, and engageable therewith to close an electric circuit upon rocking of said second arm.

References Cited in the file of this patent

UNITED STATES PATENTS

| 1,266,420 | Dean | May 14, 1918 |
| 1,572,828 | Walter | Feb. 9, 1926 |
| 1,764,958 | Jamison | June 17, 1930 |
| 2,657,287 | Lincoln et al. | Oct. 27, 1953 |
| 2,675,438 | Pederson | Apr. 13, 1954 |

FOREIGN PATENTS

| 265,947 | Great Britain | Jan. 26, 1927 |
| 544,334 | France | June 20, 1922 |
| 803,803 | Germany | Apr. 9, 1951 |